United States Patent [19]
Blais

[11] Patent Number: 5,216,236
[45] Date of Patent: Jun. 1, 1993

[54] OPTICAL TRACKING SYSTEM

[75] Inventor: Francois Blais, Orleans, Canada

[73] Assignee: National Research Council of Canada, Ottawa, Canada

[21] Appl. No.: 820,767

[22] Filed: Jan. 15, 1992

Related U.S. Application Data

[63] Continuation-in-part of Ser. No. 656,509, Feb. 19, 1991, abandoned.

[51] Int. Cl.$^5$ .............................................. G01S 17/66
[52] U.S. Cl. ................. 250/203.2; 250/203.1
[58] Field of Search ........................ 250/203.2, 203.1

[56] References Cited

U.S. PATENT DOCUMENTS 3,513,318  5/1970  Birnbaum et al. ............. 250/214 R
3,569,719  3/1971  Dryden ............................ 250/203.1

FOREIGN PATENT DOCUMENTS

2041685  9/1980  United Kingdom ............ 250/203.2

Primary Examiner—Constantine Hannaher

[57] ABSTRACT

An optical system for tracking a target scans an optical beam across the target in a Lissajous pattern. The pattern has at least one portion that extends across the target. Return signals reflected from the target are used to calculate the range (and, if desired, also the intensity) of each measured point on the target (and beyond the target if some portions of the pattern miss the target), and to calculate the deviation of a reference location on the pattern, e.g. its center, from a selected location of the target. This deviation is used to correct the scan to move the reference location on the pattern towards the selected location on the target, thus tracking the target. The amplitude of the pattern can be changed to adjust the pattern on the target or to search for a target. By virtue of the range data obtainable for points on the target and on edges of the target, the system can also determine other features, such as the shape, profile, identity and attitude of the target.

20 Claims, 5 Drawing Sheets

OPTICAL TRACKING SYSTEM

RELATED APPLICATION

This application is a continuation-in-part of application Ser. No. 07/656,509 filed Feb. 19, 1991 (now abandoned).

FIELD OF THE INVENTION

The invention relates to an optical system and method for tracking a moving target. The system may also function to search for a target prior to tracking it.

Further, the system may be used to assess the shape or profile of the target surface.

BACKGROUND OF THE INVENTION

There are many applications for tracking systems, such as the locating and tracking of missiles, satellites, and other objects in space that reflect optical pulses, namely so-called LIDAR (light radar) systems. There are other, shorter-range applications, such as the docking or repair of satellites in space.

In the present invention, the wavelength of light that can be used for the optical beam need not necessarily be in the visible portion of the spectrum, and can extend from ultraviolet light with a wavelength as short as 0.1 μm, to light in the far infrared portion of the spectrum with a wavelength as long as 100 μm.

SUMMARY OF THE INVENTION

The object of the present invention is to provide an optical tracking system and method that perform more rapidly or more reliably (or both) than prior systems.

In particular, it is an object of the preferred embodiment of the invention to achieve a system and method that are especially insensitive to optical interference or noise from extraneous sources.

The invention provides for transmitting an outgoing optical beam towards a target and receiving a return optical signal reflected by a point on the target, while determining from such beam and return signal the range of such target point. This ranging can be achieved either by triangulation or by time measurement. If the distance to the target is greater than about 20 to 30 meters, it is usually preferred to use radar type range finding, i.e. based on elapsed time between transmission and reception, in which case the transmitted beam could be pulsed, or the phase difference between transmission and reception in the case of amplitude modulation can be used to give the range information. In the case of frequency modulation the beat frequency will give the range information. If a triangulation system is to be used for ranging, one of the numerous systems described in U.S. Pat. No. 4,627,734 issued Dec. 9, 1986 to M. Rioux can be adopted.

Other 3-D (range finding) scanning systems are disclosed in "Laser range finder based on synchronized scanners" by M. Rioux published in Applied Optics Vol. 23, No. 21, November 1984, pp 3837-3844, and in "Practical Considerations for a Design of a High Precision 3-D Laser Scanner System" by F. Blais et al published in SPIE Vol. 959 Optomechanical and Electro-Optical Design of Industrial Systems (1988) pp 225-246.

The invention achieves its objective by scanning the outgoing beam in a Lissajous pattern, the pattern being of such shape and amplitude that at least one of its portions extends across the target. Using at least three and usually more of the return signals, it is possible to calculate the extent to which a reference location on the pattern, e.g. the center of the pattern, deviates from a selected location on the target, again typically (but not necessarily) the center of the target. This calculated deviation can then be applied to the scanning process to modify the position of the pattern in such a way as to move its reference location towards the selected target location and hence effectively track the target.

Subsidiary features of preferred forms of the invention that will be more fully explained below are:
1. An ability to expand and contract the pattern to adjust the pattern on the target or to search for a target prior to tracking it.
2. An ability to determine the profile, shape and/or identity and/or attitude of the target.

DETAILED DESCRIPTION OF THE PREFERRED EMBODIMENTS

Figures 1, 1A, 2:
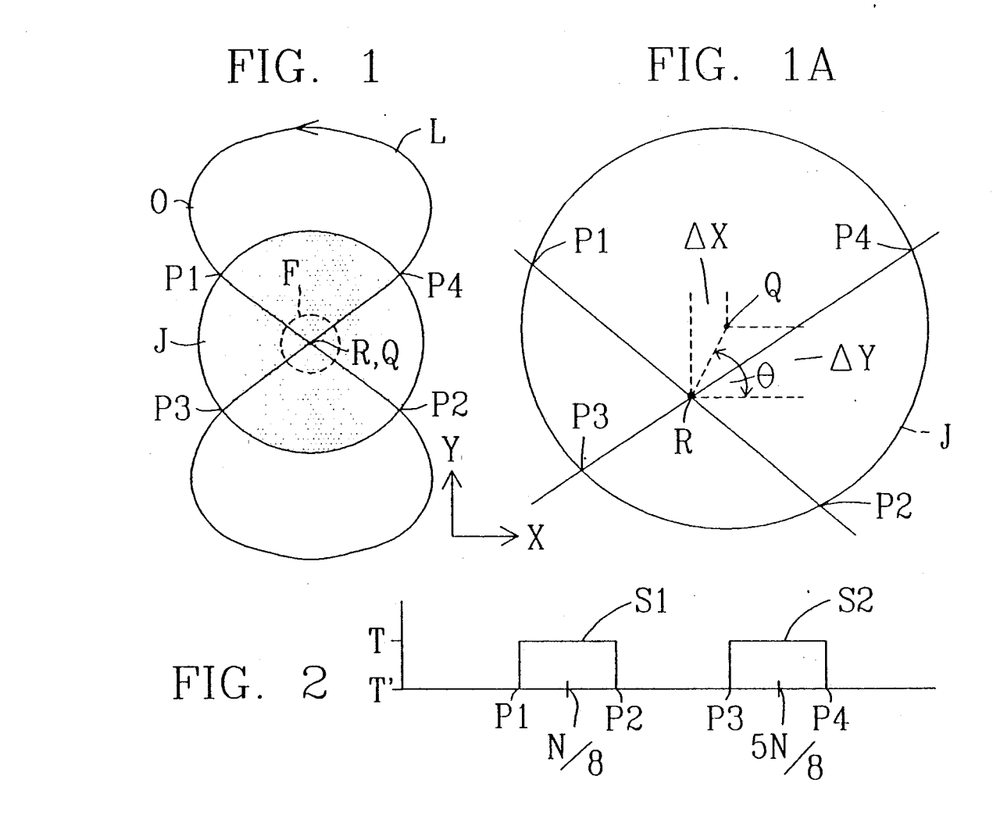
FIG. 1 is a diagram of a circular target and a Lissajous pattern traced out by an optical beam symmetrically arranged on the target to pass beyond the edges of the target and to intersect such edges as it passed over the target, in accordance with a first embodiment of the invention.
FIG. 1A is a fragment of FIG. 1 on a larger scale showing this symmetry disturbed by movement of the target.
FIG. 2 is a diagram of electrical signals produced by reflections received from the target.

FIG. 1 shows a target J (here assumed to be a flat disc) towards which a light beam is transmitted while being scanned in a simple Lissajous pattern L. Lissajous patterns are generated by two sine (or cosine) waves of different frequencies. In the case of FIG. 1, the frequencies bear the ratio 2:1 in the X and Y directions. There is also a phase difference of 90°.

The pattern L intersects the edges of the target J at successive edge points P1, P2, P3 and P4. Assuming that whenever the transmitted beam strikes the target J there is reflected light by which the range T of the target can be judged, whereas when the transmitted beam misses the target there is no reflected light (infinite range T') or light is reflected from some object more remote than the target from the transmitter and hence distinguishable by reason of its different range (somewhere between T and T'). Resulting electrical signals are shown in FIG. 2, i.e. square pulses S1 and S2 beginning respectively at points P1 and P3 and ending at points P2 and P4. The point of intersection R of the two portions of the Lissajous pattern that extend across the target will coincide with a selected location on the target, for example, its center Q. In this case the point R represents the reference location on the pattern. In practice, as the target moves, a situation such as illustrated in FIG. 1A develops, with the intersection point R deviating from the location Q by distances $\Delta X$ and $\Delta Y$ at an angle $\theta$. If N is the number of points around the pattern L starting from a point O, then the values of $\Delta X$ and $\Delta Y$ are given by:

$$\Delta X = (\Delta P12 + \Delta P34)\cos\theta$$

and $$\Delta Y = (\Delta P34 - \Delta P12)\sin\theta$$

where $$\Delta P12 = \frac{P1 + P2}{2} - \frac{N}{8},$$

$$\Delta P34 = \frac{P3 + P4}{2} - \frac{5N}{8}$$

The angle $\theta$ is known from $\Delta X$ and $\Delta Y$

For a selected reference amplitude A of the pattern L, the deviation of the actual amplitude from this reference is given by $$\Delta A = \frac{(P2 - P1) + (P4 - P3)}{2} - A$$

Figure 3:
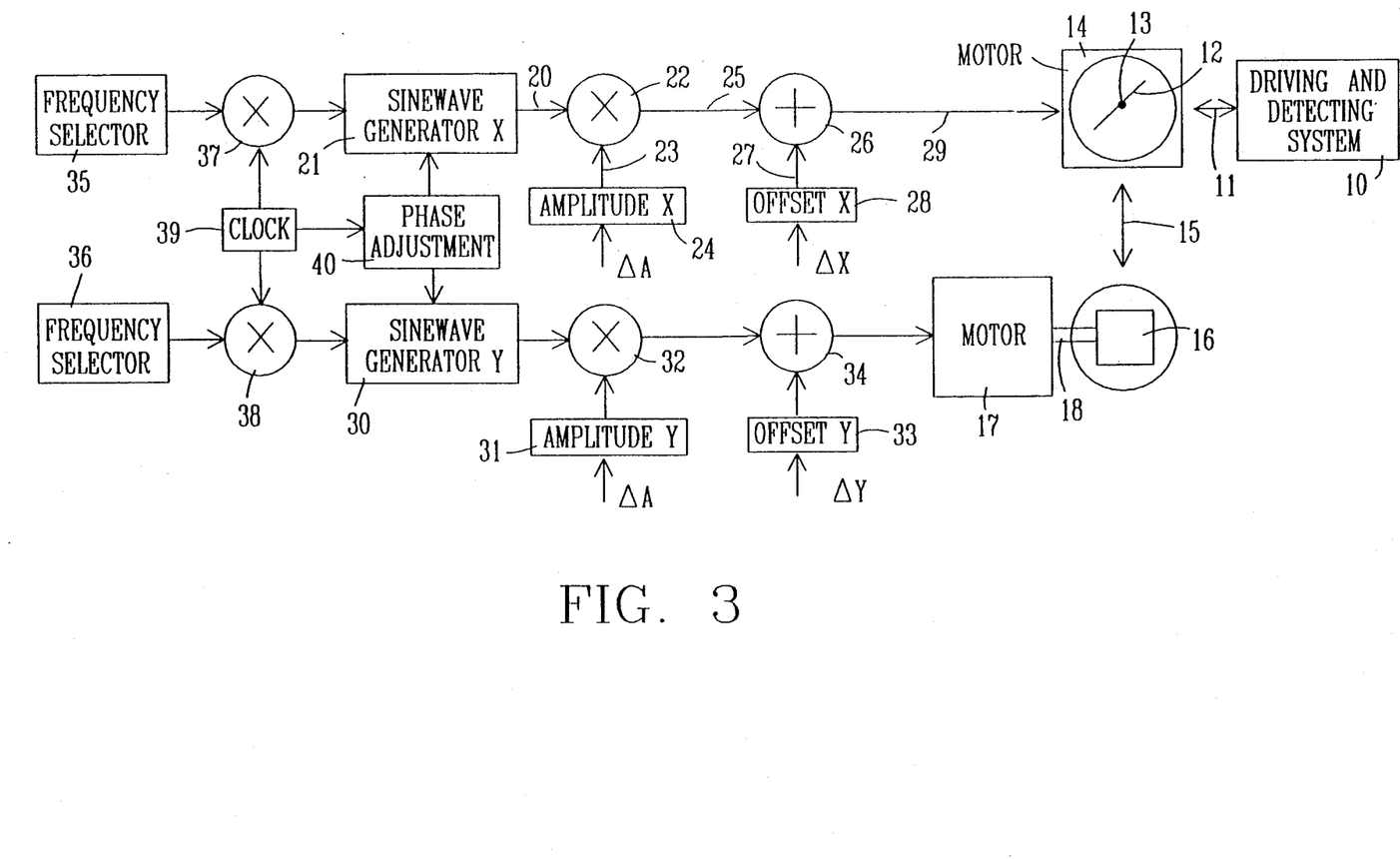
FIG. 3 shows diagrammatically a system for scanning an optical beam in a Lissajous pattern.

FIG. 3 shows a driving and detecting system for generating and scanning transmitted and reflected optical beams. The system 10 directs a beam 11 to a first mirror 12 that is rotatable about an axis 13 by a motor or galvanometer 14 (hereinafter referred to as a motor) to produce a beam 15 that travels to a second mirror 16 that is rotatable by a motor or galvanometer 17 (hereinafter referred to as a motor) about an axis 18 that is perpendicular to the axis 13. The final beam (not shown, since it extends perpendicular to the plane of FIG. 3) is transmitted to the target. The reflected signal is assumed to follow essentially the same path in reverse and is received in the system 10.

The motor 14 which controls scanning in the X direction is oscillated by an output 20 of a first sinewave generator 21, multiplied in multiplier 22 by an output 23 of an amplitude setting circuit 24 that is basically set to generate the reference amplitude A and receives the $\Delta A$ value as an input. The output 25 from the multiplier 22 is received in an adder 26 which receives a signal 27 from an offset circuit 28 that receives the $\Delta X$ value as an input. The output 29 of the adder 26 controls the motor 14 and hence the angle of the mirror 12.

A similar system for controlling scanning in the Y direction by the mirror 16, consists of a second sinewave generator 30, an amplitude setting circuit 31, a multiplier 32, an offset circuit 33 (that receives the $\Delta Y$ value). and an adder 34.

The two waveform generators 21 and 30 are controlled by respective frequency selectors 35 and 36, through multipliers 37 and 38, controlled by a clock 39. The selected phase difference between the outputs of the sinewave generators will be set by means of a phase adjustment circuit 40.

Because of the inertia of the mirrors 12 and 16 and the motors 14, 17 driving them, in order to achieve a high oscillation rate of these mirrors, it is necessary to drive the motors 14, 17 with high amplitude outputs from the circuits 24, 31. The result is that the actual oscillation of each mirror lags behind the input signal to its motor, but nevertheless remains sinusoidal, and, by virtue of the large amplitude, attains the full travel required. The lag can be compensated for by adjusting the phase in the circuit 40. For example, a mirror/motor assembly that has an inherent band width of 40 Hz can be caused to oscillate as high 500 Hz by these means. This ability to achieve high-speed scanning is an advantage of the Lissajous figure operation because such figure is made up solely of sinusoidal components. Scanning in any figure not solely comprising sinusoidal components would be distorted by the lag which could not be compensated for by a simple phase shift and a simple amplitude change.

Figure 4:
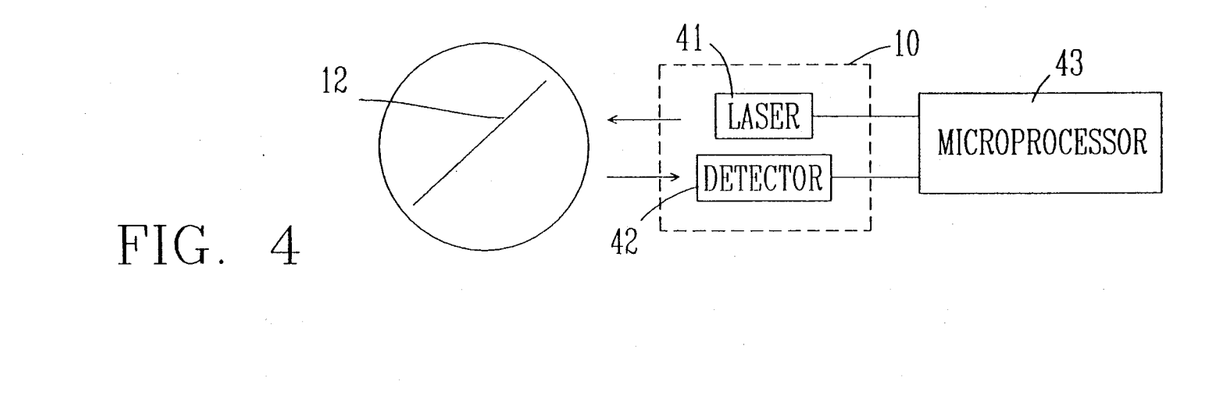
FIG. 4 shows diagrammatically one embodiment of a driving and detecting system for use in the arrangement of FIG. 3.

There are various ways in which the driving and detecting system 10 can be constructed. As shown in FIG. 4, the transmitted beam can be generated by a laser 41 and the return signal detected by a detector 42, these devices being arranged closely side-by-side. The laser 41 and detector 42 will be controlled by a microprocessor 43 that will determine the range as well as generating the values of $\Delta X$, $\Delta Y$, and $\Delta A$ in accordance with the equations above.

Figure 5:
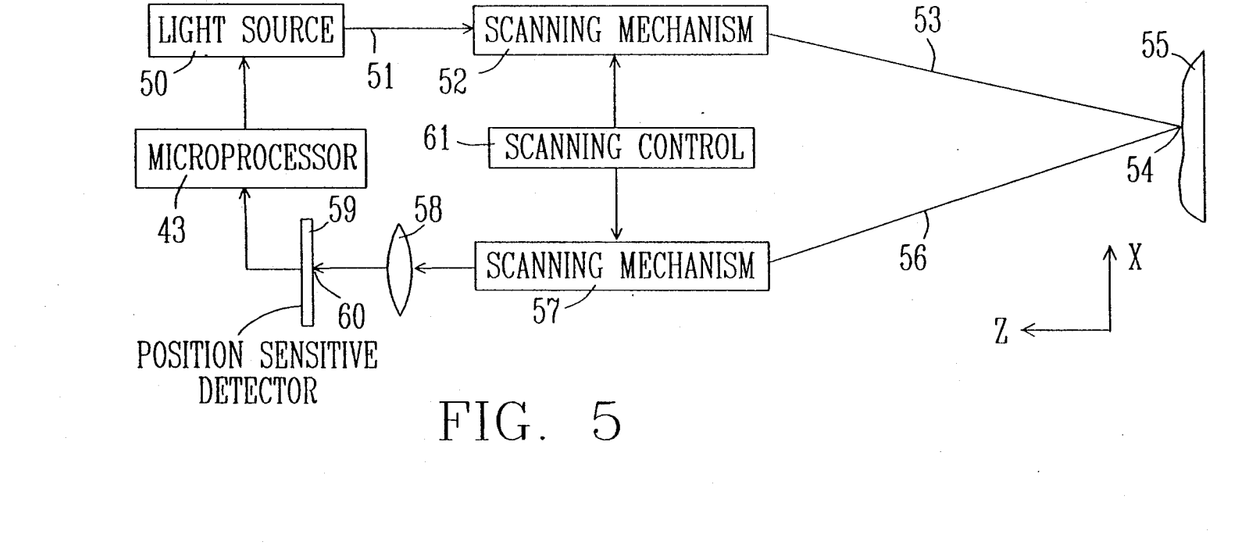
FIG. 5 shows diagrammatically another embodiment of a driving and detecting system.

FIG. 5 shows a system based on FIG. 2 of the Rioux patent mentioned above, a light source 50 (preferably, but not necessarily, a laser) emitting a beam 51 to a first scanning mechanism 52 that forwards a beam 53 to a point 54 on a target 55. A reflected signal 56 is passed through a scanning mechanism 57 and a lens 58 to strike a position sensitive detector 59 at a point 60, the location of which is indicative of the range of the point 54. The two scanning mechanisms 52, 57 can be synchronised to follow the same Lissajous pattern by a circuit such as in FIG. 3, shown in FIG. 5 as a scanning control 61. Alternatively, a single scanning mechanism can be used for both the outgoing and return beams as demonstrated in any one of FIGS. 4-6 or 9-15 of the Rioux patent, preferably the system shown in FIG. 12 of this patent.

Figure 6:
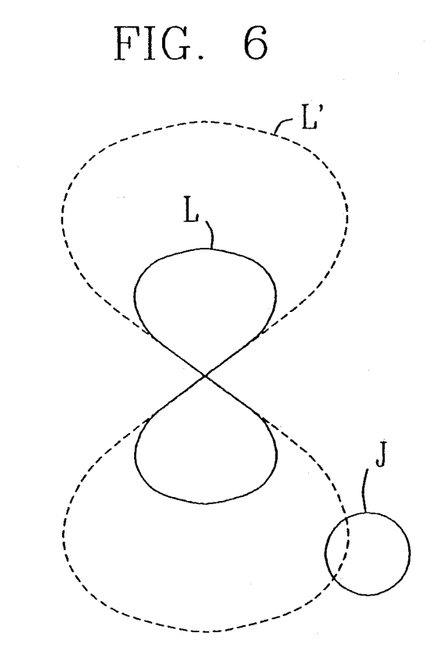
FIG. 6 illustrates how the system can be used in a search mode.

When the system is to be used to locate a target J not initially intersected by the pattern L (FIG. 6), the amplitude of the pattern can be increased, as shown at $L^1$, until intersection takes place. The system can then revert to the normal tracking mode, bringing the Lissajous pattern onto the target and reducing its amplitude to a value such as shown in FIG. 1. In the embodiment of FIG. 1 in which the pattern L has portions that extend beyond the edges of the target, it is usually preferred that the distance from P1 to P2 (and the distance from P3 to P4) be about 25% of the total length of the Lissajous pattern, so that the beam strikes the target about 50% of the time and misses it about 50% of the time, although these values can be varied to suit different circumstances, especially irregularly shaped targets.

In addition to, or instead of, searching for a target by this expansion of the Lissajous pattern, the entire pattern can be moved either in a random manner or in a regulated scan, such as a raster type scan, to bring the pattern near enough to the target to achieve at least initial contact.

It will be appreciated that FIG. 2 shows a series of signals that determine range. It is also possible to add some intensity measurements to the range measurements. For example, if the target J were to have a portion, such as a central portion F (FIG. 1), of a different colour from the remainder of the target surface, the return signals from the target as the beam pattern passes onto and off from the portion F will provide intensity signals that appear basically the same as those in FIG. 2. In this case, while the primary assessment of the target is still based on range, it is possible to simultaneously employ intensity data to provide additional information about the nature of the target surface.

To this point, a simple, so-called 1:2 Lissajous pattern has been discussed. In practice, it may often be desirable to employ one of the more complex Lissajous patterns that will produce more than one intersection. FIGS. 7A to 7F respectively show patterns generated by frequency ratios of 1:3, 2:3, 3:4, 3:5, 4:5 and 5:6, all with the two sine waves out of phase with each other. Although not illustrated ratios of 6:7 or 7:8 or higher can be used. The preferred phase relationship is either 90° or 180°. While one of these phase relationships is not essential, it is desirable, since it produces fully symmetrical patterns, whereas other phase relationships tend to produce patterns with less symmetry. The phase relationship referred to is the initial phase relationship at the beginning of a scan. Since the frequencies differ, the phase relationship will differ during a scan.

Figure 7E:
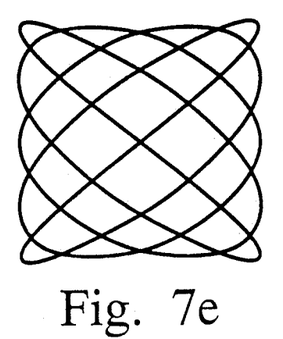
Figure 7F:
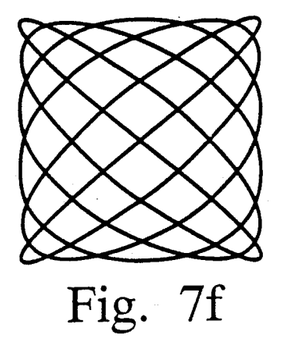
Figure 8:
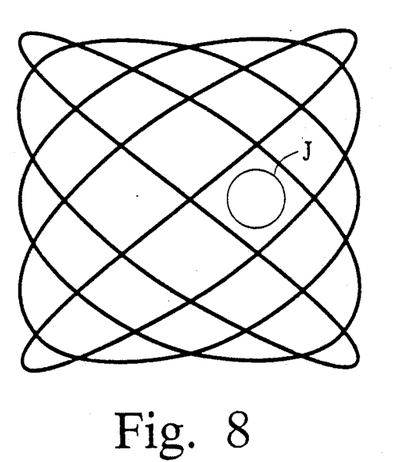
FIG. 8 shows an alternative to FIG. 6.

A much faster method of operating the system in the search mode is shown in FIG. 8. Here the pattern of FIG. 7E is used to cover a large portion of the field of view. If the target J falls within one of the spaces of this pattern, it can quickly be detected, either by a small movement of the pattern in any direction or by a contraction of the pattern. Thus, in the search mode the pattern can be scanned over the entire search area or it can be repeatedly contracted and reexpanded to cover the entire search area. Or a combination of these techniques can be used.

Figure 9:
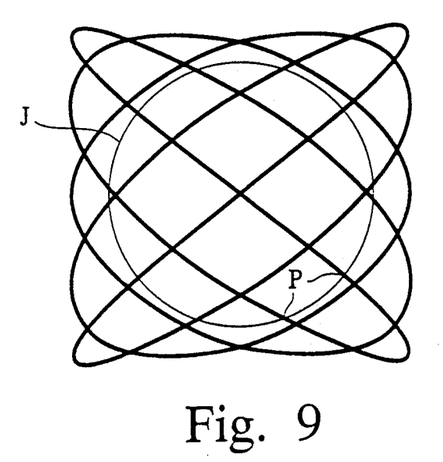
FIG. 9 shows a manner of use of the complex Lissajous pattern of FIG. 8.

Similarly, the complex Lissajous patterns such as those in FIGS. 7A to 7F can be used to improve the accuracy of the tracking by having more points to calculate the error signals $\Delta A$, $\Delta X$, and $\Delta Y$, such as in FIG. 9. FIG. 9 shows the pattern contracted so as to produce a large number of edge points P where portions of the pattern cross onto or leave the target J.

The system can be used to track a number of targets simultaneously using the same driving and detecting system and the same mirrors. To achieve this result with two targets, the arrangement of FIG. 3 would be augmented to have two of each of the elements 24, 28, 31, 33, 35, 36 and 40, with switching means for switching over simultaneously and repeatedly from one set of these elements to the other, so that the targets would be scanned alternately. One set would produce a first Lissajous pattern tracking the first target, and the other set would produce a different Lissajous pattern tracking the second target. A number of targets larger than these could be tracked simultaneously in this way by providing a corresponding number of such sets.

An important characteristic of Lissajous patterns is their relatively uniform density. Rosette patterns have in the past been used for tracking systems, because they have a very high center density. A Rosette pattern is especially suitable for detecting a relatively small target at a long distance, but is less efficient at tracking the target once it has been found because so much of the pattern is concentrated at or near its center. Because a Lissajous pattern is more uniformly distributed than a Rosette pattern, it has faster performance, a feature that can be very important when tracking a fast moving target. A Lissajous pattern scan is also more accurate than a raster scan or a vector scan.

An important advantage of a laser scanner over a conventional TV camera approach for tracking satellites or space shuttles is its insensitivity to background illumination, such as light coming from the earth, and especially from the sun, and its reflections. Good immunity from background noise can be obtained, due to the fact that laser light is emitted over a very narrow band of frequencies which can be tuned by filters, and the possibility of having a small instantaneous field of view looking only at the target.

At close range, the two techniques (laser scanner and TV camera) are comparable in terms of range accuracy. At longer range, photogrammetry is still more accurate but suffers from background light interference. Because the laser scanner has the capability to identify and locate a satellite, even with the sun shining directly into the sensor, integration of these techniques enables them to benefit from one another.

In addition to tracking a target and determining its range, the present invention can also be used to assess the shape of the target.

Figure 7A:
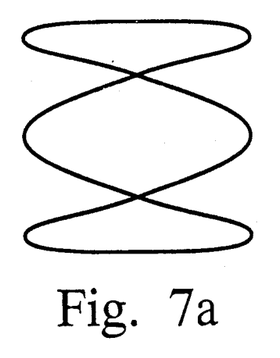
FIGS. 7A to 7F show alternative Lissajous patterns that can be used.
Figure 7B:
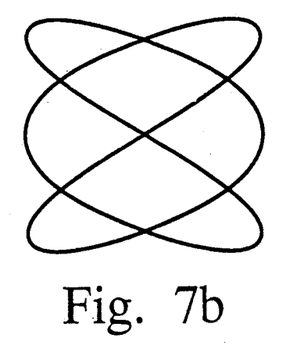
Figure 7C:
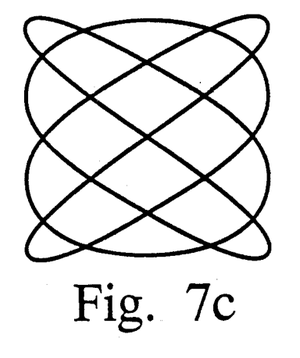
Figure 7D:
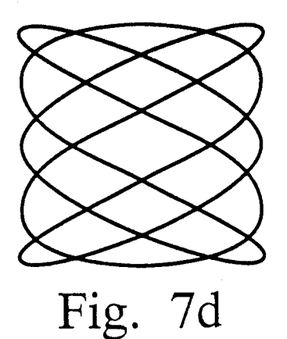
Figure 10:
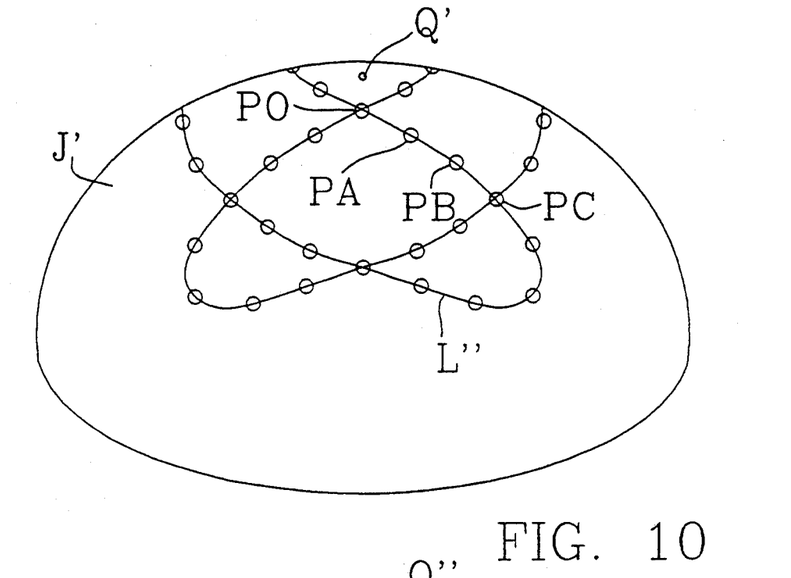
FIGS. 10 and 11 show further alternative applications of the invention.
Figure 11:
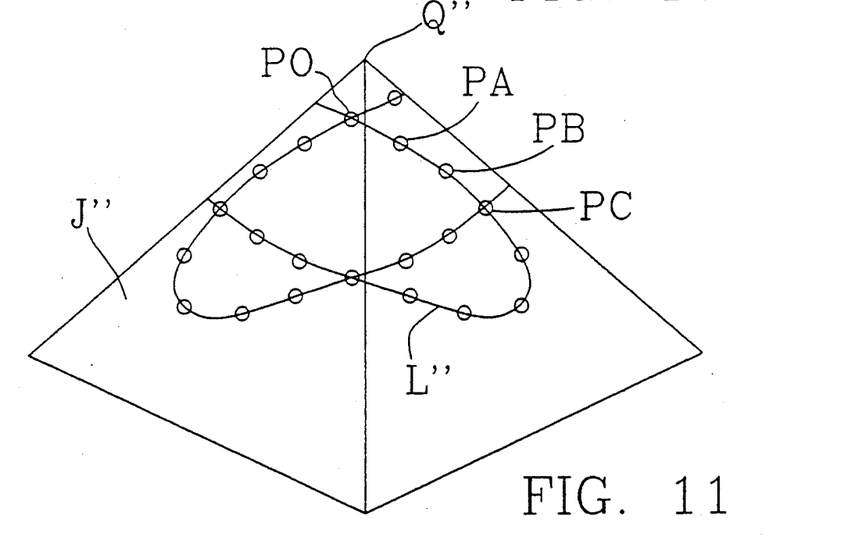

FIG. 10 shows a hemispherical target J' and FIG. 11 shows a pyramidal target J" each scanned with a Lissajous pattern L" of the type shown in FIG. 7B. In addition to the central intersection point PO of this pattern, the microprocessor 43 can be employed to measure the range of each of a relatively large number of points on the target, such as points PA, PB, PC, these points not necessarily being at intersections of portions of the Lissajous pattern L". When, as in FIGS. 10 and 11, the shape of the target is such that changes of range will occur between almost every adjacent pair of measured points, there is no need for the pattern to have portions that extend beyond the edges of the target, and it will be noted that the pattern L" is fully within the targets J' and J". The range data will both enable identification of the deviation of the central intersection point PO from the selected location on the target, such as the pinnacle Q' of the hemisphere J' or the apex Q" of the pyramid J" to cause the target to be tracked in a like fashion to that already described, and enable the microcomputer to assess the three dimensional surface shape of the target. The more measurement points that are used, the more refined this shape measurement will be.

The invention can be practiced in some circumstances, e.g. when the target is of a shape such as shown in FIG. 10, with a 1:1 Lissajous pattern with an initial phase relationship of 180°, namely a circular pattern. Another example of a situation in which a circular pattern would be appropriate is when the target has a generally cruciform shape, each of four segments of the circle intersecting a respective arm of the target. Hence in this application including the claims, the term "Lissajous pattern" includes a circle.

In the patterns of FIGS. 7A to 7F, the chosen reference location on the pattern need not necessarily be a point where two portions of the pattern intersect. For example, in FIGS. 7A or 7D, the reference location could be the geometrical center of the pattern, even though such center is blank. On the other hand, in FIG. 7D for example the reference location on the pattern could be one of the intersections, preferably one of the intersections near the geometric center in order that the system should track the target with the center of the pattern reasonably close to the selected location on the target. When the Lissajous pattern is a circle, it will be appropriate to chose its center as the reference location.

The minimum number of measurement points from the viewpoint of tracking is three, but since this relatively small number of points will yield only very crude data on the target shape, a much larger number will usually be used in practice when shape assessment is required. In a case where the shape of the target is known, but its dimensions are unknown, as in FIG. 1, the minimum number of measurement points is four. If the dimensions are known, then this number can be reduced to three by using the range information to evaluate the necessary amplitude of the scan.

As well as assessing the surface shape, the system can assess the profile of the target, i.e. the edge outline as seen from the transmitting and receiving location. For this purpose the Lissajous pattern will have its amplitude adjusted to extend beyond such edge, as in FIG. 1, a relatively complex Lissajous pattern preferably being employed in order to provide a relatively large number of points where the pattern intersects the edge and hence provide sufficient data to be able to achieve a comparatively detailed assessment of the profile.

If the target profile is generally circular, it may be useful to fit the scanning pattern to the target using one of the minimum least square methods or the Robust Fitting method. See, for example, "Segmentation of Geometric Signals using Robust Fitting" by G. Roth et al published in Proceedings of the Tenth International Conference on Pattern Recognition, Atlantic City, N.J., Jun. 16-19, 1990 pp 826-832. If the target profile is irregular, either the Robust Fitting or the Hough Transform technique is preferred. These techniques are valid for either 2D or 3D data, i.e. when either only the edges of the target or all the range data of the visible surface of the target are measured.

The microprocessor can compare the calculated profile and/or surface shape of the target with stored data on the shapes of known objects to achieve identification. Assuming that data on the three dimensional shape of the target, say a satellite, is known, the profile and/or surface shape seen by the system can be compared with such data to indicate the attitude of the target.

When a satellite is the target, a Lissajous pattern can be employed to surround the entire satellite, or alternatively, it can be directed at only one part of the satellite, such as a corner of a solar panel where the edges of the target will be especially well defined, i.e. such corner will become the selected target location. If desired, the target can be provided with reflectors of known shape mounted at known locations on the target to enhance the return signals, although it is one of the features of the present invention that reflectors are not essential, and for many targets would be unnecessary.

I claim:

1. An optical tracking system comprising means for transmitting an outgoing optical beam towards a target and for receiving a return optical signal reflected by a point on the target, including means for measuring the range of said target point, characterized by
   a) means for scanning said beam in a Lissajous pattern of such shape and amplitude that at least one portion of the pattern extends across the target,
   b) means for calculating from separate return optical signals received respectively from at least three individual points on the target a deviation of a reference location on the pattern from a selected location on the target, and
   c) means for applying said deviation to the scanning means to modify the position of the pattern to move said reference location towards said selected location and hence track the target.

2. A system according to claim 1, wherein portions of the pattern extend beyond edges of the target, said at least three points being located at the edges of the target.

3. A system according to claim 2, wherein the calculating means includes means for measuring the profile of the target form the measured ranges of a number of points on the edges of the target.

4. A system according to claim 3, wherein the calculating means includes means for comparing the measured target profile with data on the profiles of known objects to enable the target and its attitude to be identified.

5. A system according to claim 1, wherein the Lissajous pattern is a symmetrical one generated by two sine or cosine waves.

6. A system according to claim 5, wherein the frequencies of the two waves have a ratio to each other selected from 1:1, 1:2, 1:3, 2:3, 3:4, 3:5, 4:5, 5:6, 6:7, 7:8.

7. A system according to claim 1, including means for varying the amplitude of the Lissajous pattern.

8. A system according to claim 1, wherein said scanning means comprise
   d) means for generating a first sine or cosine wave output of a first frequency,
   e) means for generating a second sine or cosine wave output of a second frequency, the relationship between these frequencies being such as to generate a Lissajous pattern, and
   f) means controlled by said first and second wave outputs for oscillating respective mirrors about axes perpendicular to each other, said mirrors being located in the paths of the outgoing beam and of the return signals,
   g) said means for applying the deviation to the scanning means including offset means for applying said components of the deviation respectively to said first and second wave outputs.

9. A system according to claim 1, including means for measuring the intensity of a return optical signal reflected by a point on the target to provide additional data on the nature of the target.

10. A system according to claim 1, wherein the calculating means includes means for measuring the surface shape of the target from the measured ranges of a number of points on the target.

11. A system according to claim 10, wherein the calculating means includes means for comparing the measured target shape with data on the shapes of known objects to enable the target and its attitude to be identified.

12. An optical method of tracking a target comprising transmitting an outgoing optical beam towards a target and receiving a return optical signal reflected by a point on the target, including measuring the range of said target point, said method being characterized by
   a) scanning said beam in a Lissajous pattern of such shape and amplitude that at least one portion of the pattern extends across the target,
   b) calculating from at least three separate return optical signals reflected respectively by at least three individual said points on the target a deviation of a reference location on the pattern from a selected location on the target, and c) applying said deviation to the scanning means to modify the position of the pattern to move said reference location towards said selected location and hence track the target.

13. A method according to claim 12, including measuring the intensity of a return optical signal reflected by a point on the target to provide additional data on the nature of the target.

14. A method according to claim 12, including measuring the surface shape of the target from the measured ranges of a number of points on the target.

15. A method according to claim 14, including comparing the measured target shape with data on the shapes of known objects to enable the target and its attitude to be identified.

16. A method according to claim 12, including measuring the profile of the target from the measured ranges of a number of points on edges of the target.

17. A method according to claim 16, including comparing the measured target profile with data on the profiles of known objects to enable the target and its attitude to be identified.

18. A method according to claim 12, wherein the Lissajous pattern is a symmetrical one generated by two sine or cosine waves of frequencies having a ratio to each other selected from 1:1, 1:2, 1:3, 2:3, 3:4, 3:5, 4:5, 5:6, 6:7, 7:8.

19. A method according to claim 12, including initially searching for a target to be tracked by varying the amplitude of the Lissajous pattern.

20. A method according to claim 12, including simultaneously tracking at least one other target by scanning each target alternately using a different Lissajous pattern for each target.

* * * * *